United States Patent [19]
Gupta

[11] Patent Number: 5,317,734
[45] Date of Patent: May 31, 1994

[54] METHOD OF SYNCHRONIZING PARALLEL PROCESSORS EMPLOYING CHANNELS AND COMPILING METHOD MINIMIZING CROSS-PROCESSOR DATA DEPENDENCIES

[75] Inventor: Rajiv Gupta, Ossining, N.Y.

[73] Assignee: North American Philips Corporation, New York, N.Y.

[21] Appl. No.: 400,178

[22] Filed: Aug. 29, 1989

[51] Int. Cl.⁵ .............................................. G06F 13/00
[52] U.S. Cl. .................................. 395/650; 364/280;
364/280.4; 364/281.3; 364/281.8; 364/282.1;
364/283.2; 364/283.3; 364/DIG. 1
[58] Field of Search ................................ 364/200, 900

[56] References Cited

U.S. PATENT DOCUMENTS

| | | | |
|---|---|---|---|
| 4,553,203 | 11/1985 | Rau et al. | 364/200 |
| 4,698,752 | 10/1987 | Goldstein et al. | 364/200 |
| 4,837,676 | 6/1989 | Rosman | 364/200 |
| 4,847,755 | 7/1989 | Morrison et al. | 364/200 |
| 4,891,787 | 1/1990 | Gifford | 364/900 |
| 4,916,652 | 4/1990 | Schwartz et al. | 364/200 |
| 4,989,131 | 1/1991 | Stone | 364/200 |

Primary Examiner—Gareth D. Shaw
Assistant Examiner—John Q. Chavis
Attorney, Agent, or Firm—Jack D. Slobod

[57] ABSTRACT

A method of synchronizing the parallel processors of a multiple instruction stream multiprocessor employs a limited number of register channels, which may be re-used, for enforcing cross-stream data or event dependencies by passing data or event notifications in a synchronizing fashion. Cross-stream dependencies which by virtue of identified "synchronization redundancey" do not require enforcement by register channels are passed by writing to and reading from ordinary shared memory. A compiling method schedules the instructions into parallel instruction streams by reference to a directed acyclic graph (DAG), in a manner to minimize the production of cross-stream dependencies. The scheduling is determined beginning from the highest nodes in the DAG and proceeding to nodes in order of descending node height in a manner tending and tends to assign whole sub-graphs of the DAG to different processors.

15 Claims, 10 Drawing Sheets

| NODE # | DEPTH | HEIGHT |
|---|---|---|
| $N_1, N_2$ | 5 | 1 |
| $N_3-N_6$ | 6 | 1 |
| $N_7, N_8$ | 4 | 1 |
| $N_9$ | 2 | 1 |
| $N_{10}$ | 4 | 2 |
| $N_{11}, N_{12}$ | 5 | 2 |
| $N_{13}$ | 3 | 2 |
| $N_{14}$ | 4 | 3 |
| $N_{15}$ | 3 | 4 |
| $N_{16}$ | 2 | 5 |
| $N_{17}$ | 1 | 6 |

METHOD OF SYNCHRONIZING PARALLEL PROCESSORS EMPLOYING CHANNELS AND COMPILING METHOD MINIMIZING CROSS-PROCESSOR DATA DEPENDENCIES

BACKGROUND OF THE INVENTION

The present invention relates generally to methods of synchronizing multiprocessors having parallel processors for execution of parallel related instruction streams and also to compiling methods for generating the streams. In its particular aspects, the present invention relates to techniques for substantially minimizing cross-stream event or data dependencies and to the enforcement of event or data dependencies between processors utilizing channels for communicating between the processors in a synchronizing fashion.

The increase in execution speed over that of a uniprocessor by utilizing parallel processors to cooperatively perform sequential programs depends on the effective exploitation of the program's fine-grained parallelism to enable parallel operations to be performed contemporaneously on different processors. While loop-level parallelism is generally exploited effectively in commercially available multiprocessor systems, the extra-loop (or non-loop) parallelism present in the sequential parts of the program is more difficult to exploit effectively.

THE VERY LONG INSTRUCTION WORD (VLIW) family of architectures can exploit the fine-grained parallelism present in the sequential parts of a program. Known machines of this type utilize a compiler based upon trace scheduling (see, for example, J. A. Fisher, "TRACE SCHEDULING: A TECHNIQUE FOR GLOBAL MICROCODE COMPACTION", IEEE Trans. on Computers, vol. 7, no. C-30, p.p. 478-490, July 1981) to detect and schedule extra-loop parallelism in sequential parts of the program and also exploit loop-level parallelism by unrolling the loops and converting loop-level parallelism into extra-loop parallelism.

However, a VLIW machine consists of multiple processors that operate in lockstep executing instructions fetched from a single instruction stream. The long instruction word allows initiation of several fine-grained operations in each instruction, allowing operations to be scheduled for parallel execution by different processors. While the lockstep operation of the processors implicitly guarantees that the processors are synchronized, the speed of a VLIW machine is severely compromised by run-time events which are unpredictable at compile-time. For example, memory bank access conflicts cannot always be avoided as the operands required for an operation may not be known at compile-time. Such run-time events can cause delay in completion of one of the operations in a long instruction which will delay completion of the entire instruction.

The extention of VLIW architecture to multiple instruction stream architecture requires means to synchronize the parallel processors to assure that data developed by one processor and needed by another has been already written by the one processor to shared storage means when the other processor attempts to read the storage means. The use of shared storage means for enabling data to be passed between processors also requires additional synchronization to assure that the data in a memory location has been read by all processors needing it before other data is written thereto.

One method of synchronizing processors is by the provision of barriers in the instruction streams, as explained in my co-pending application Ser. No. 227,276, filed Aug. 2, 1988, to assure the temporal order of cross-processor events such as the writing to and reading from shared memory. In the present invention, parallel processors are synchronized in a different way; namely by communicating cross-stream dependent data between processors in a synchronizing fashion.

The HEP multiprocessor (see B. J. Smith, "ARCHITECTURE AND APPLICATIONS OF THE HEP MULTIPROCESSOR COMPUTER SYSTEM", REAL-TIME SIGNAL PROCESSING, vol. 298, p.p. 241-248, August, 1981 and J. S. Kowalik, Editor, "PARALLEL MIMD COMPUTATION: HEP SUPERCOMPUTER AND ITS APPLICATIONS", MIT Press, 1985) implements a large number of channels capable of synchronizing communication of data between processors by adding a synchronization bit to every location in shared memory and in the register set. Control bits in each instruction indicate whether a read operation is unconditional or must wait until the location is "full". However, in the HEP multiprocessor, the synchronization bit does not generally cause a processor to stall if the bit is not in the proper state. Rather, a process stalls leaving the program counter and the instruction unchanged in the process. Execution shifts to another process and the unexecuted instruction is reattempted only when its process makes the next trip through the pipeline. Meanwhile, instructions from other streams are issued to keep the pipeline full. Consequently, the HEP approach is not particularly useful unless the number of streams exceed the number of processors in the system. Also, the potentially infinite number of channels implemented in shared memory are not useful for communicating processor synchronizing events or data because of their relative slowness compared to channels implemented in registers. On the other hand, channels implemented in registers, though useful for communicating synchronizing events, are inherently limited in number in order to be able to be addressed in typical instructions referring to one or more registers or functions. Consequently, the number of cross-processor dependent events or data requiring synchronization as a result of the application of known compilation techniques for VLIW architecture for typical sequential programs may exceed the number of useful channels available to enforce such dependencies.

SUMMARY OF THE INVENTION

It is an object of the present invention to provide a method of multiprocessor operation for synchronizing the processors utilizing a relatively small number of means for rapid synchronizing communication between the processors. It is a further object of the present invention to provide a compiling method for generating parallel instruction streams in a manner substantially minimizing cross-stream data (including event) dependencies.

These and other objects are implemented by the provision of a relatively small number of register channels to convey synchronizing data dependencies between processors. The conveyance of cross-processor dependent "data" (which term is meant to also include notification of the occurrence of an event) is characterized by a write operation by one processor to storage means and a read operation from the storage means by another processor. One feature of the invention is that so-called "synchronization redundant" cross-processor data dependencies may be conveyed in a non-synchronizing fashion through a first write to and a subsequent last read from conventional shared memory (not having a synchronization bit) so as to not tax the limited register channel resources. The synchronization of these synchronization redundant data dependencies is guaranteed by the enforcement through one or more register channels of respective one or more other cross-processor data dependencies characterized by a temporal sequence of one or more write-read pairs beginning with a second write by the one processor, not earlier than the first write, and a next to last read by the other processor not later than the last read. The temporal order of the various write or read events is determined by the register channels and the relative locations of the writes or reads in the instruction streams for the various processors.

In the compiling method, operations from a sequential program are scheduled into plural parallel streams and the writing and reading of cross-stream data dependencies is also scheduled. In order to accomplish this, the sequential program is first described as a directed acyclic graph of nodes, representing operations, and directed edges representing data dependencies, and the nodes are scheduled into the plurality of instruction streams. The edges between nodes then are either intra-stream or inter-stream edges. The method of scheduling is such that the nodes are ordered in the streams in a manner that the intra-stream edges are directed downstream implicitly enforcing the data dependencies represented by the intra-stream edges. The inter-stream edges represent cross-stream (or cross-processor) data dependencies requiring transfer of data between processors.

According to another feature of the invention, synchronization redundant cross-stream edges are identified allowing the non-synchronization redundant cross-stream edges to be scheduled as write-read pairs on a limited number of synchronizing data transfer means implemented as channel registers.

According to yet another feature of the invention, the method of scheduling the nodes into streams is chosen to substantially minimize the number of resulting inter-stream edges. This is accomplished by determining the scheduling in inverse order and, in particular, by first identifying unscheduled nodes having the greatest height in the graph which nodes are then scheduled into different streams in a manner minimizing the production of inter-stream edges. Still another feature of this method is that after the nodes having the greatest height are scheduled, sub-graphs rooted from these nodes are identified and an equal number of nodes from each sub-graph in order of descending node height are scheduled into the same respective streams as the rooting nodes. An additional feature of the compiling method is the identification among inter-stream edges of candidates for re-use of the same synchronizing data transfer means.

The invention is further characterized by the identification of implicit synchronizations caused by the possibility of blocking to writing on re-used inter-processor data transfer means and the further identification among inter-stream edges of those edges rendered synchronization redundant thereby.

The various features of the invention by reducing or minimizing the number of cross-processor data dependencies requiring enforcement in a synchronizing fashion, enable the multiprocessor to effectively exploit the fine-grained parallelism in typical programs while requiring only a limited number of register channels to be implemented for synchronizing the parallel processors thereof.

BRIEF DESCRIPTION OF THE DRAWING

Other objects, features and advantages of the present invention will become apparent upon perusal of the following detailed description of the preferred embodiments when taken in conjunction with the appended drawing, wherein:

FIG. 1b is a diagram of the organization of the bit positions of one of the shared register channels in FIG. 1a;

FIG. 2a is an illustrative directed acyclic graph for a particular sequence of data dependent instructions;

FIG. 2b is a chart indicating node height and depth in the graph of FIG. 2a;

DETAILED DESCRIPTION OF THE PREFERRED EMBODIMENTS

Figure 1A:
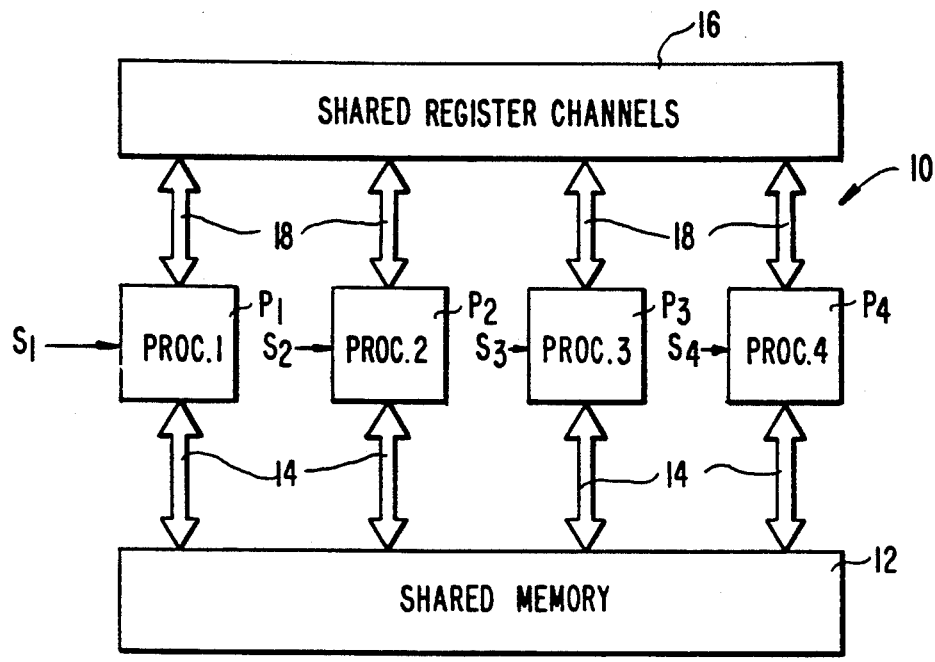
FIG. 1a is a schematic diagram of a multiprocessor according to the principles of the invention, including shared register channels.
Figure 1B:
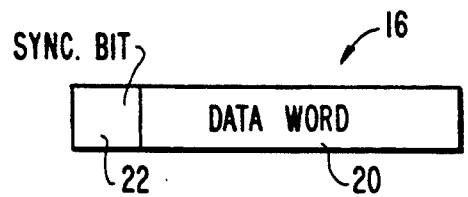

Referring first to FIGS. 1a and 1b of the drawing, a multiprocessor 10, organized in MULTIPLE INSTRUCTION STREAM MULTIPLE DATA STREAM (MIMD) form, is illustrated comprising a plurality of processors $P_1-P_4$ (four in number being illustrative) for respectively performing sequential instructions in an equal number of instruction streams $S_1$-$S_4$. Streams $S_1$-$S_4$ are respectively input to the processors $P_1$-$P_4$ from a suitable instruction memory means (not shown). Also not specifically illustrated is that each processor includes its own internal registers and possibly its own memory which provide means for data developed by a processor to be stored for later use by the processor in conjunction with downstream operations in the instruction stream for the processor.

The multiprocessor 10 also includes a conventional shared random access memory 12 comprising a relatively large number of memory locations which can be selectively read or written by any of the processors $P_1$-$P_4$ via address and data lines 14 directed between each processor and shared memory 12. The shared memory 12 cannot be used for passing cross-processor or cross-stream dependent data between processors without other means for synchronization being applied. This is because the shared memory 12 has no implicit means for assuring that a value is not read before it is written (i.e. the memory location has been first filled) and a new value is not written to a memory location until after an existing value in the memory location has been read (i.e. the memory location has been first emptied). On the other hand, a limited number of shared register channels 16 are provided to be accessed by any of the processors $P_1$-$P_4$ at substantially the same relatively rapid rate that each processor would access one of its internal registers, via data, address and control lines 18 from the respective processors. However, register channels 16 also have the communication attributes or semantics of channels enabling blocking to reading or to writing for synchronizing purposes. Each of the shared register channels 16 includes an area 20 for storage of a data word, of the same form or number of bits as could be stored in a shared memory location, plus an additional area 22 for a synchronization bit indicating whether the register channel is full or empty.

The instruction sets of the processors include conventional write and read instructions directed to shared memory 12 and preferably the following instructions directed to the shared register channel 16:

CLEAR. Set synchronization bit to "zero" indicating a register channel is empty.

NON-DESTRUCTIVE READ. A read can take place when the synchronization bit is "one" indicating the channel is full. The synchronization bit is left unchanged by the non-destructive read enabling a subsequent read. As long as the synchronization bit is "zero" the register channel is blocked to reading.

DESTRUCTIVE READ. Same as non-destructive read except upon reading, the synchronization bit is set to "zero".

NON-DESTRUCTIVE WRITE. If the synchronization bit is "zero", the value is written and the synchronization bit is set to "one" indicating the register channel is full; as long as the synchronization bit is "one", the register channel is blocked to writing.

DESTRUCTIVE WRITE. Same as non-destructive write except that the write is done even if the synchronization bit is "one". After writing the synchronization bit is "one".

The instruction streams $S_1$-$S_4$ are generated by compiling a sequential program so as to take advantage of fine-grained parallelism in a program by identifying sequences of operations which can be performed in parallel on different processors. This requires analysis of data or event dependencies between operations in the sequential program.

Figure 2:
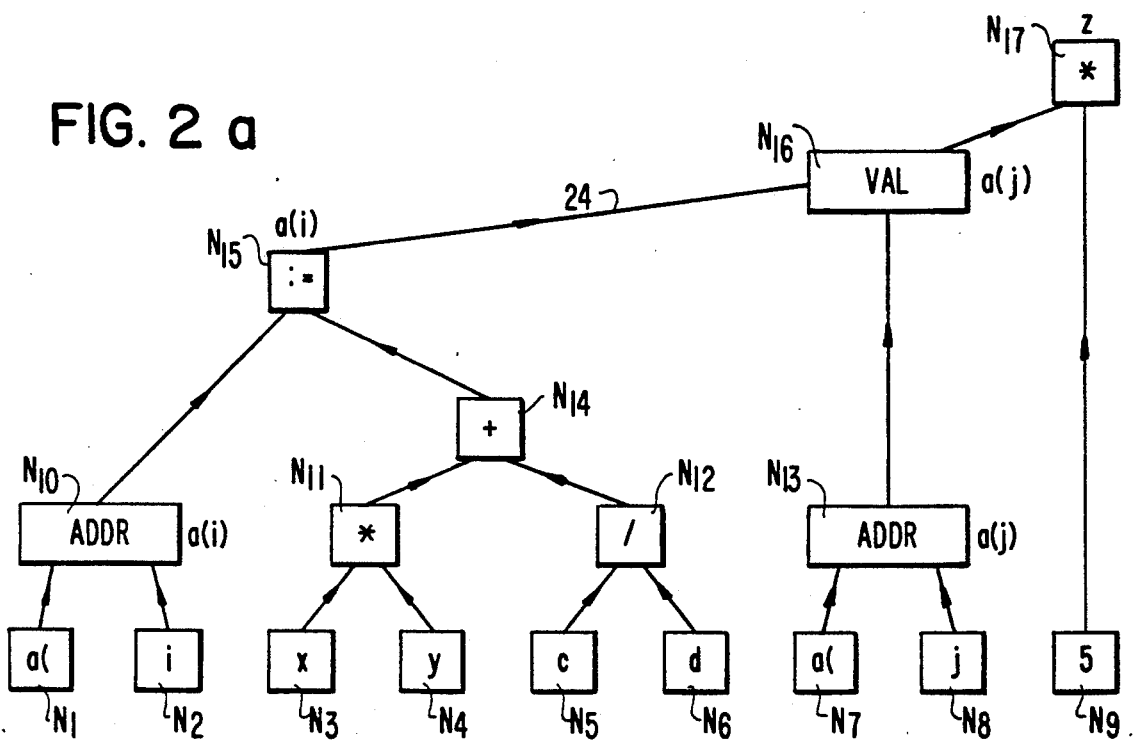

FIG. 2a shows a simple directed acyclic graph (DAG) for the following illustrative sequential program steps:

$$a[i] := x*y + c/d$$

$$z := a[j]*5$$

Therein, the rectangular boxes represent operations, termed "nodes", which are numbered N1 through N17 for purposes of reference, and directed lines between nodes representing data or event dependencies termed "edges". In particular, nodes N1 through N9 represent operations producing the various data for the illustrative program steps, and nodes N10 through N17 represent the performance of the sequential program steps upon the data. In the example presented N15 receives a data value from N14 and receives data in the form of address value from N10. N15 assigns (writes) the value to the address, developing a[i]. N16 receives an address from N13 and reads that address to evaluate a[j]. Since it is necessary that a[i] has been already assigned by N15 because if i=j then N15 assigns value of a[j], the edge 24 directed from N15 to N16 is shown representing a type of data dependency which is an event dependency. N17 is at the top of the graph because it receives the value of a[j] from N16, a constant from N9 and evaluates the final operation to produce z.

The scheduling of the nodes into plural instruction streams is done with reference to node height or depth in the DAG. FIG. 2b sets forth the depths and heights of the various nodes in the graph of FIG. 2a. If the graph is analogized to a family tree with each edge being directed from a child node to its immediate parent node, then for depth purposes, N17 has a depth equal to one and each other node has the depth of its immediate parent plus one. For height purposes, each of nodes N1 through N9 have a height equal to one and each other node has a height of one plus the height of its tallest child. It should further be apparent that the nodes should be selected for scheduling into plural instruction streams with the nodes of the greatest depth and/or the least height in the DAG generally to be performed first and the nodes of the least depth and/or the greatest height generally to be performed last.

Figure 3:
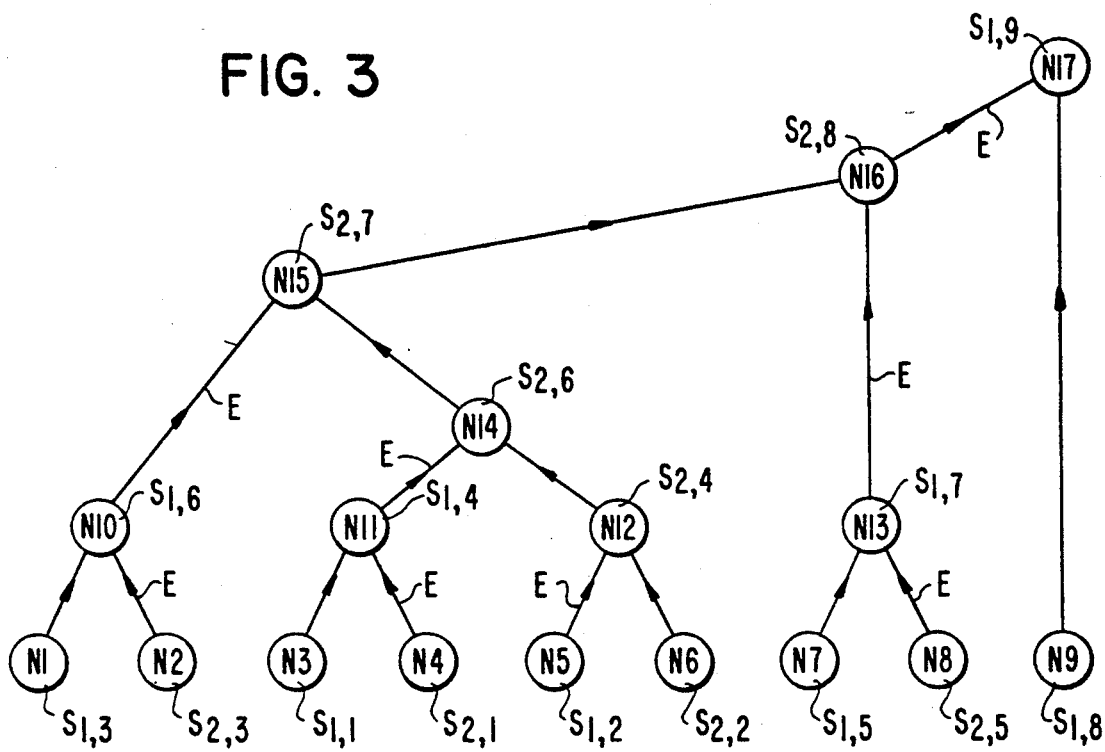
FIG. 3 is the directed acyclic graph of FIG. 2a, with operational labels eliminated, and showing the result of scheduling the nodes among two parallel instruction streams by a naive method of assignment.

FIG. 3 shows a directed acyclic graph (DAG), similar to that of FIG. 2a, with the nodes represented as circles which contain the designations N1-N14, the operations being deleted because only the form of the DAG is now important. Each node is also labelled with one of the designations $S_{1,1}$-$S_{1,9}$ and $S_{2,2}$-$S_{2,8}$ to indicate the scheduling by a naive method of assignment of the nodes respectively in first and second instruction streams for execution by respective first and second parallel processors.

In the naive method, first the nodes ready to be scheduled are identified having the greatest depth and are alternately assigned among the instruction streams. Thus, N3-N6 are respectively assigned in order as: the first instruction in the first stream ($S_{1,1}$); the first instruction in the second stream ($S_{2,1}$); the second instruction in the first stream ($S_{1,2}$); and the second instruction in the second stream ($S_{2,2}$). The next level of node depth ready to be scheduled is next identified as nodes N1, N2, N11 and N12, and the alternative assignment among the instruction streams of the identified nodes is continued.

Thereafter, further levels of node depth are identified and scheduled until all nodes are scheduled. When the result of the naive method is examined, eight edges, labelled "E", are inter-stream or cross-stream representing data dependencies required to be enforced between processors.

Figure 4:
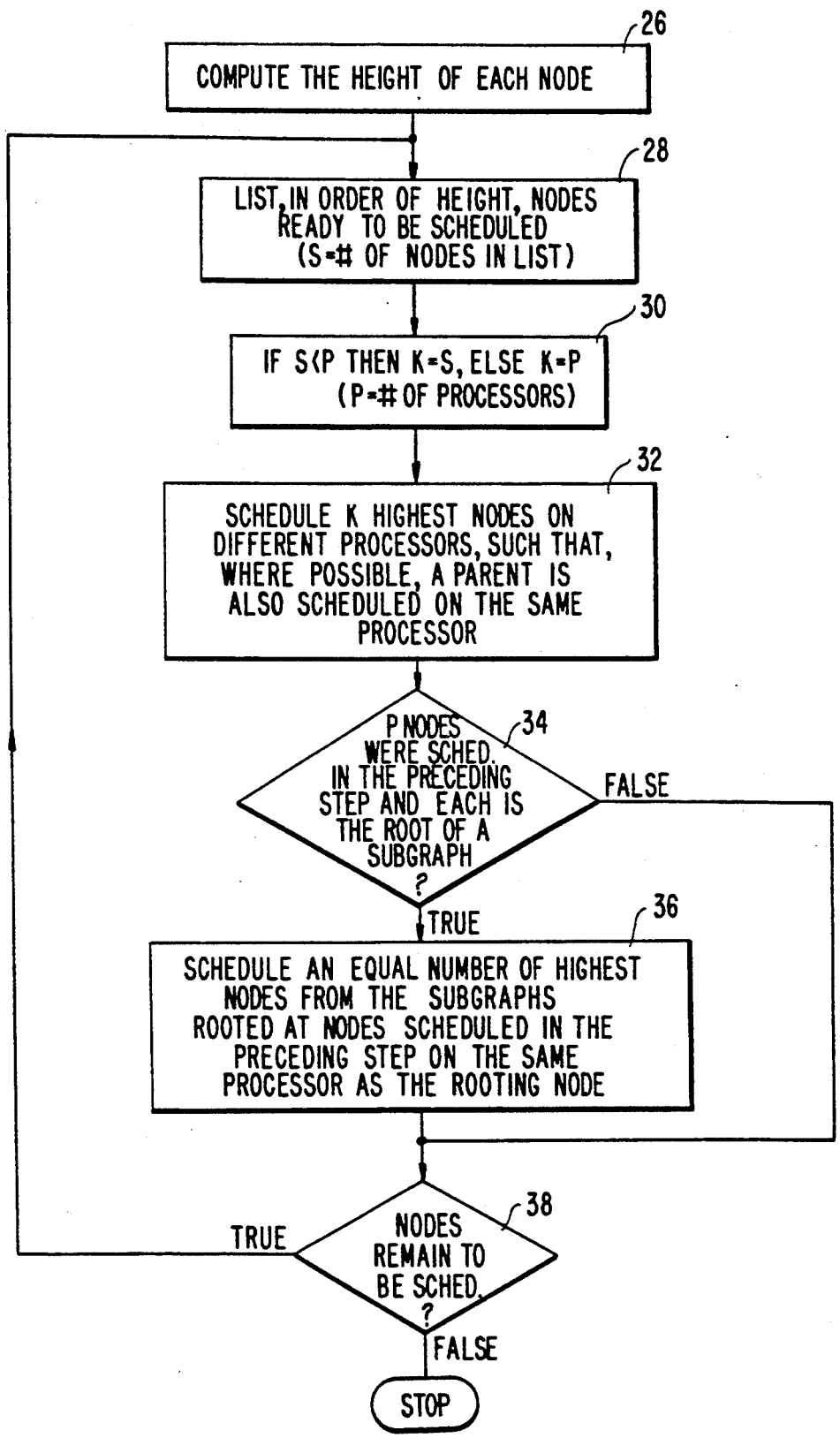
FIG. 4 is a flow chart illustrating, according to the invention, the method of scheduling nodes among parallel instruction streams.
Figure 5:
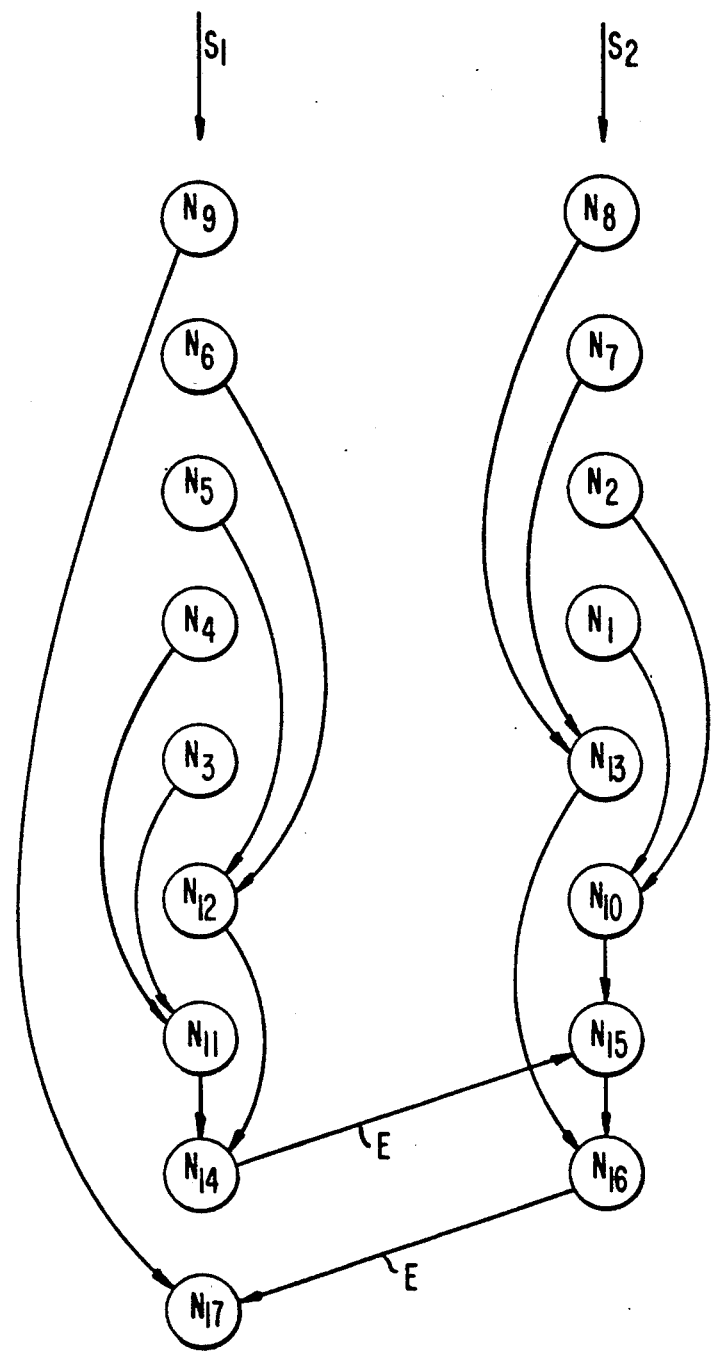
FIG. 5b is the directed acyclic graph of FIG. 5a rearranged into instruction streams in accordance with the scheduling.

FIG. 4 is a flow chart of the compiling method for scheduling the nodes into multiple instruction streams in accordance with the principles of the invention which will minimize the number of inter-stream edges produced. Therein, the scheduling of the nodes is determined in inverse order based, among other things, on node height rather than depth. Thus, in the first step 26, the height of each node is determined in the DAG. Then, in step 28, a list is generated in order of height of the nodes ready to be scheduled. Next, in step 30, it is determined whether the nodes ready to be scheduled are less than the number of processors (or streams). In step 32, the number of nodes ready to be scheduled, up to the number of processors, are scheduled on different processors such that, where possible, the node is scheduled on the same processor as its immediate parent. Step 34 determines whether a node was scheduled on each processor in the preceding step and whether each such node is the root (parent) of a sub-graph. If so, step 36 is performed in which an equal number of the highest nodes from the smallest sub-graphs rooted at these nodes are scheduled on the same processors as the rooting node. If step 34 was false there is a branch to step 38 which ordinarily follows step 36. In step 38 it is determined if nodes remain to be scheduled. If so, there is a branch back to step 28; if not the scheduling process stops.

Figure 5A:
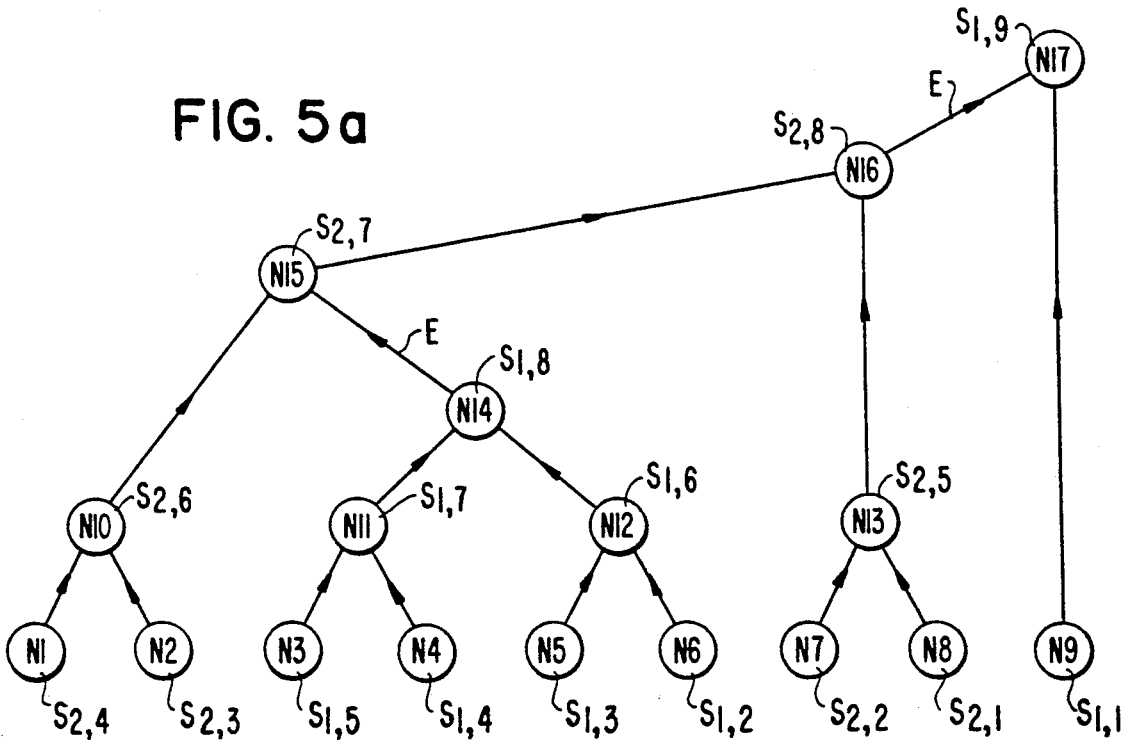
FIG. 5a is a directed acyclic graph similar to FIG. 3 but showing the scheduling of the nodes into two parallel instruction streams in accordance with the flow chart of FIG. 4.

The application of this compiling or scheduling method to the directed acyclic graph of FIG. 2a, as shown in FIG. 5a, produces only two inter-stream edges, labelled E. The method is better understood by the following steps with regard to FIG. 5a: it is first determined that because there are 17 nodes to be scheduled, 9 nodes will be scheduled in the first stream at positions $S_{1,1}$-$S_{1,9}$ and 8 nodes in the second stream at positions $S_{2,1}$-$S_{2,8}$. Initially, the nodes N17 and N16 are ready to be scheduled because N17 has no parent and the scheduling of N17 will allow N16 to be scheduled. These nodes are respectively scheduled as the last operation in the first stream ($S_{1,9}$) and the last operation in the second stream ($S_{2,8}$). N16 roots two sub-graphs rather than a single sub-graph causing step 34 to be false, step 38 to be true resulting in return to step 28. In step 28 nodes N15 and N14 are identified as ready to be scheduled and they are scheduled in step 32 as $S_{2,7}$ and $S_{1,8}$ respectively. Again, since N14 roots two sub-graphs rather than one sub-graph, step 34 is again false ultimately causing return to step 28 and the identification therein of nodes of N10 through N13 as ready to be scheduled. In step 32, nodes N10 and N11 are respectively scheduled as $S_{2,6}$ and $S_{1,7}$. Again, since $S_{1,8}$ roots two sub-graphs, step 28 is returned to with the identification of nodes N12 and N13 as ready to be scheduled. Nodes N12 and N13 are respectively scheduled as $S_{1,6}$ and $S_{2,5}$. Thereafter, nodes N1 through N9 are identified as ready for scheduling and in similar sequential steps N1 through N9 are assigned in pairs as follows:

$N_1$; $N_3$ as $S_{2,4}$; $S_{1,5}$
$N_2$; $N_4$ as $S_{2,3}$; $S_{1,4}$
$N_5$; $N_4$ as $S_{1,3}$; $S_{2,2}$
$N_6$; $N_8$ as $S_{1,2}$; $S_{1,1}$

It should now be apparent how the cross-processor edges can be substantially minimized by scheduling nodes in inverse order based on node height because this approach tends to assign whole sub-graphs to different processors minimizing the amount of data passing between processors. When scheduled nodes which each root their own sub-graph, the compiling process is accelerated by step 36 which schedules an equal number of highest nodes from the sub-graphs on the same processor as the rooting node is scheduled.

FIG. 5b illustrates the rearrangement of the nodes of FIG. 5a in the order of the scheduling, into two columns representing the first and second instruction streams $S_1$ and $S_2$ respectively. The operations in streams $S_1$ and $S_2$ are performed respectively by processors $P_1$ and $P_2$ in downstream order. Various edges directed between nodes in the same column are referred to as intra-stream edges and are all directed downstream. The two edges E produced directed between columns are termed "cross-stream", "cross-processor" or "inter-stream" edges. Since the progress of execution along the two streams may vary relative to each other, according to the invention synchronization of the edges E are provided by a limited number of register channels which, by blocking to reading unless they have been written, assure that the execution of stream $S_2$ will stall if necessary just prior to N15, waiting for the result of N14 in stream $S_1$ to be determined. Similarly, execution of stream $S_1$ may stall just prior to N17 waiting for the result of N16 to be determined in stream $S_2$. In fact, the same register channel may be re-used to enforce both the inter-stream edges E because the order of traversal of these edges is guaranteed by N16 being downstream from N15.

Figure 6:
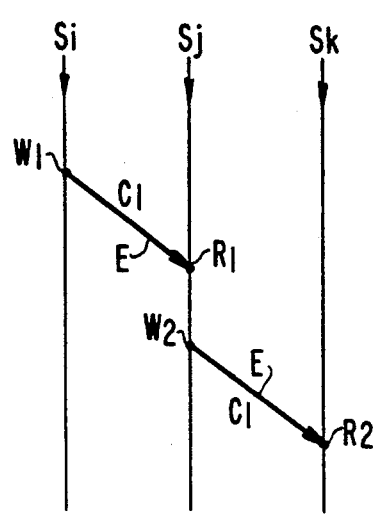
FIGS. 6a and 6b are drawings of parallel instruction streams illustrating safe re-use of channels.
Figure 6:
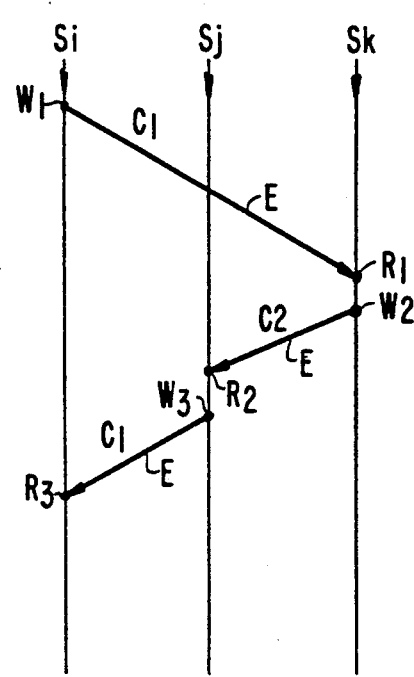

FIGS. 6a and 6b depict the conditions for safe re-use. Each figure illustrates three instruction streams $S_i, S_j, S_k$ with Write/Read pairs to a register channel enforcing or synchronizing inter-stream edges "E" each directed from a write operation "W" to a read operation "R". This enforcement is due to the semantics of the channel blocking to reading if it has not yet been written. In FIG. 6a, a first inter-stream edge is directed from $W_1$, scheduled in $S_i$, to $R_1$, scheduled in $S_j$, while a second edge is directed from $W_2$, scheduled in $S_j$ downstream from $R_1$ to $R_2$ scheduled in stream $S_k$. Because $W_2$ must be after $R_1$, each edge may be assigned to the same register channel $C_1$, there being no possibility that $W_2$ could occur in time before $W_1$ or that $R_2$ could occur in time before $R_1$. In FIG. 6b three inter-stream edges are illustrated with a first edge directed from $W_1$ to $R_1$, assigned to $C_1$, a second edge directed from $W_2$ to $R_2$, assigned to $C_2$, (although it could have been assigned also to $C_1$), and a third edge directed from $W_3$ to $R_3$ for which $C_1$ is re-used. This re-use is permitted because $W_2$ is downstream from $R_1$ and $W_3$ is downstream from $R_2$ assuring the temporal order of enforcement of the inter-stream edges.

Figure 7:
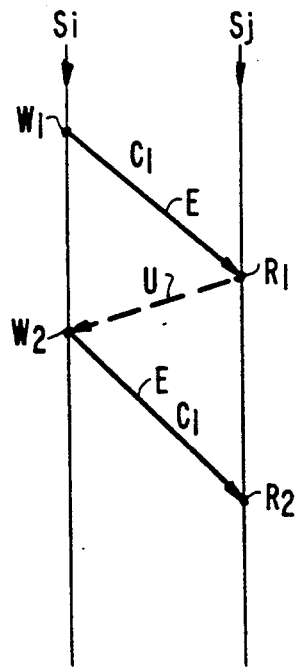
FIG. 7 is a diagram of parallel instruction streams illustrating an implicit synchronization caused by channel re-use.

FIG. 7 illustrates another situation where channel register re-use is permitted but creates an additional synchronization termed an "implicit" synchronization. Therein, first and second edges are directed from $S_i$ to $S_j$ with $W_2$ being downstream from $W_1$ in $S_i$ and $R_2$ being downstream from $R_1$ and $S_j$. If both edges are enforced by the same register channel $C_1$, there arises the possibility of $C_1$ blocking to $W_2$ until $R_1$ occurs. This is represented by an inter-stream implicit synchronization U directed from $R_1$ to $W_2$.

Figure 8A:
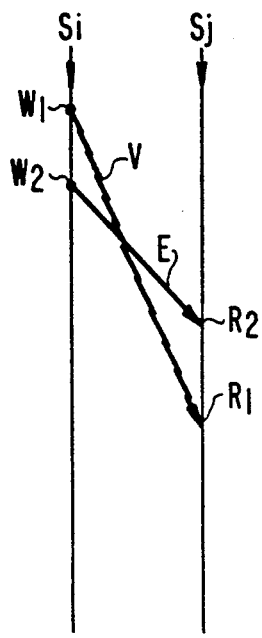
FIG. 8a is a diagram of instruction streams illustrating a simple synchronization redundancy.

FIG. 8a shows the simple case of a first inter-stream edge V which is redundantly synchronized by a second inter-stream edge E. Therein, edges V and E are directed $W_1$ and $W_2$ in stream $S_i$ respectively to $R_1$ and $R_2$ in stream $S_j$. Because $W_2$ is downstream from $W_1$ and $R_1$ is downstream from $R_2$, enforcing E will assure that V is enforced. Stated differently, because $W_2$ must be after $W_1$ and $R_1$ must be after $R_2$, forcing $R_2$ to be after $W_2$ assures that $R_1$ is after $W_1$. Consequently, the data dependency represented by V need not be enforced by a register channel and $W_1$ and $R_1$ can instead be directed to shared memory 12.

Figure 8B:
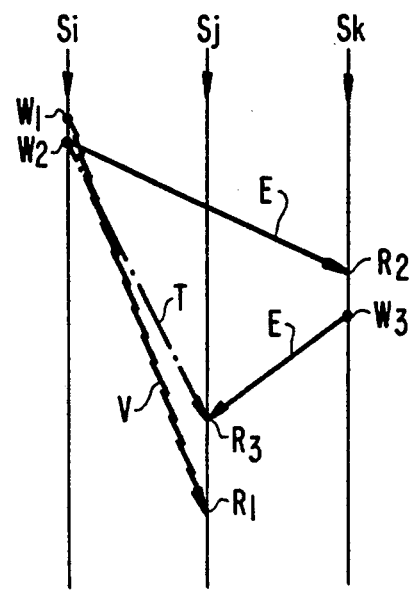
FIG. 8b is a diagram of instruction streams illustrating a redundant synchronization in conjunction with an implied synchronization.

FIG. 8b shows an implied synchronization T created by second and third edges E. In general, an implied synchronization T is directed from the beginning to the end of a series of enforcements of synchronizations and downstream movements. Thus, in FIG. 8b, there is the synchronization from $W_2$ to $R_2$, the downstream movement along $S_k$ from $R_2$ to $W_3$, and the synchronization from $W_3$ to $R_3$. The implied synchronization T then makes edge V directed from $W_1$ to $R_1$ synchronization redundant according to the rule of FIG. 8a. Alternatively, the synchronization redundancy of V can be directly established by a rule requiring a series of downstream movements and enforcements of synchronizations directly from $W_1$ to $R_1$.

Figure 9:
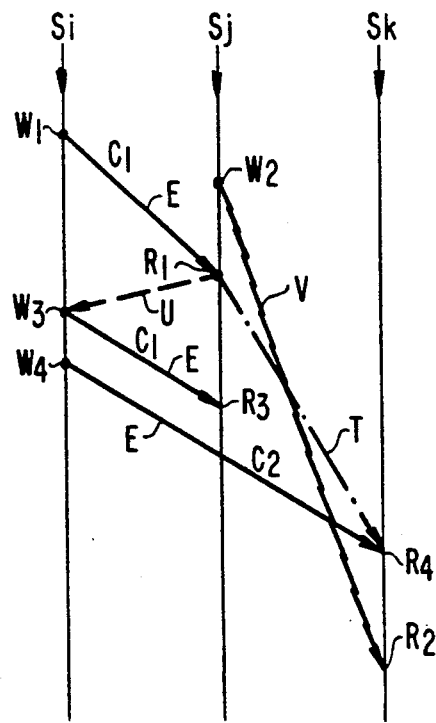
FIG. 9 is a diagram of instruction streams illustrating a redundant synchronization in conjunction with implied and implicit synchronizations.

FIG. 9 illustrates the interaction of the aforementioned types of synchronizations. Therein, implicit synchronization U directed from $R_1$ to $W_3$ due to the re-use of $C_1$ as in FIG. 7, together with the edge from $W_1$ to $R_1$, the downstream movement from $W_3$ to $W_4$ and the edge from $W_4$ to $R_4$, create the implied synchronization T from $R_1$ to $R_4$ which then renders edge V synchronization redundant.

Figure 10:
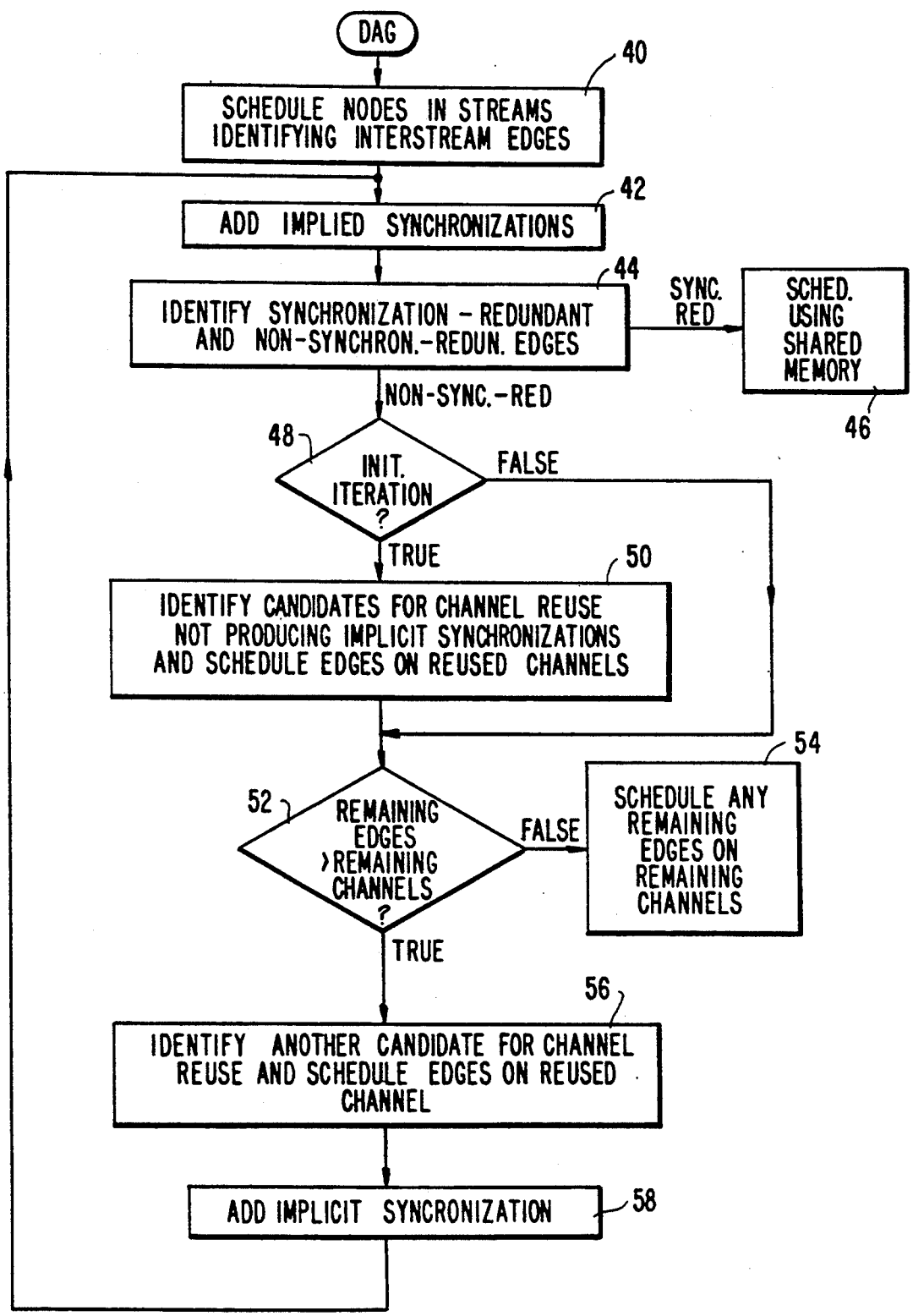
FIG. 10 is a flow chart illustrating the inventive method of identifying redundant synchronizations in conjunction with register channel assignment.

FIG. 10 is a flow chart of the further compiling method according to the invention for register channel assignment, the input to which is the directed acyclic graph (DAG) which in step 40 is scheduled into plural instruction streams, as in FIG. 4, and the resultant inter-stream edges E are identified. Next, in step 42, implied synchronizations, as in FIG. 8b are added by identifying sequences of edges among three or more streams as in FIG. 8b. Next, in step 44, synchronization redundancies are identified according to the principles of FIGS. 8a, 8b or 9 and, as a result, the inter-stream edges are divided into two classes, synchronization redundant and non-synchronization redundant. The synchronization redundant edges are scheduled in step 46, by a write to and a read from shared memory 12, while the non-synchronization redundant edges are further analyzed for register channel assignment.

In step 48, a branch is developed which in the initial reiteration, or first pass, goes to step 50 in which candidates among the non-synchronization redundant edges for re-use of channels, not producing implicit synchronizations, as in FIGS. 6a and 6b are identified and scheduled by re-use of the channels. In other than the first iteration, the branch in step 48 causes step 50 to be bypassed because such candidates for channel re-use have already been assigned. Next, in step 52, it is determined whether the remaining number of non-synchronization redundant edges exceed the number of remaining channels available for assignment. If not, the remaining edges are scheduled in step 54. If, however, more edges remain than available channels, then step 56 is reached wherein another candidate for channel re-use is identified. Such candidates are of the type as in FIG. 7. Next, the implicit synchronization produced thereby is added in step 58 and the steps are repeated beginning with step 42 where further implied synchronizations are added due to the added implicit synchronization and further that in step 44 edges rendered synchronization redundant thereby are identified and scheduled in step 46. It should now be apparent that this process will in general enable complete synchronization by assignment of edges to register channels providing the number of register channels is sufficient for the requirements of typical programs. Accordingly, an example of the application of the principles of the invention to a typical sequential program is herein discussed in conjunction with FIGS. 11 and 12.

Figure 11:
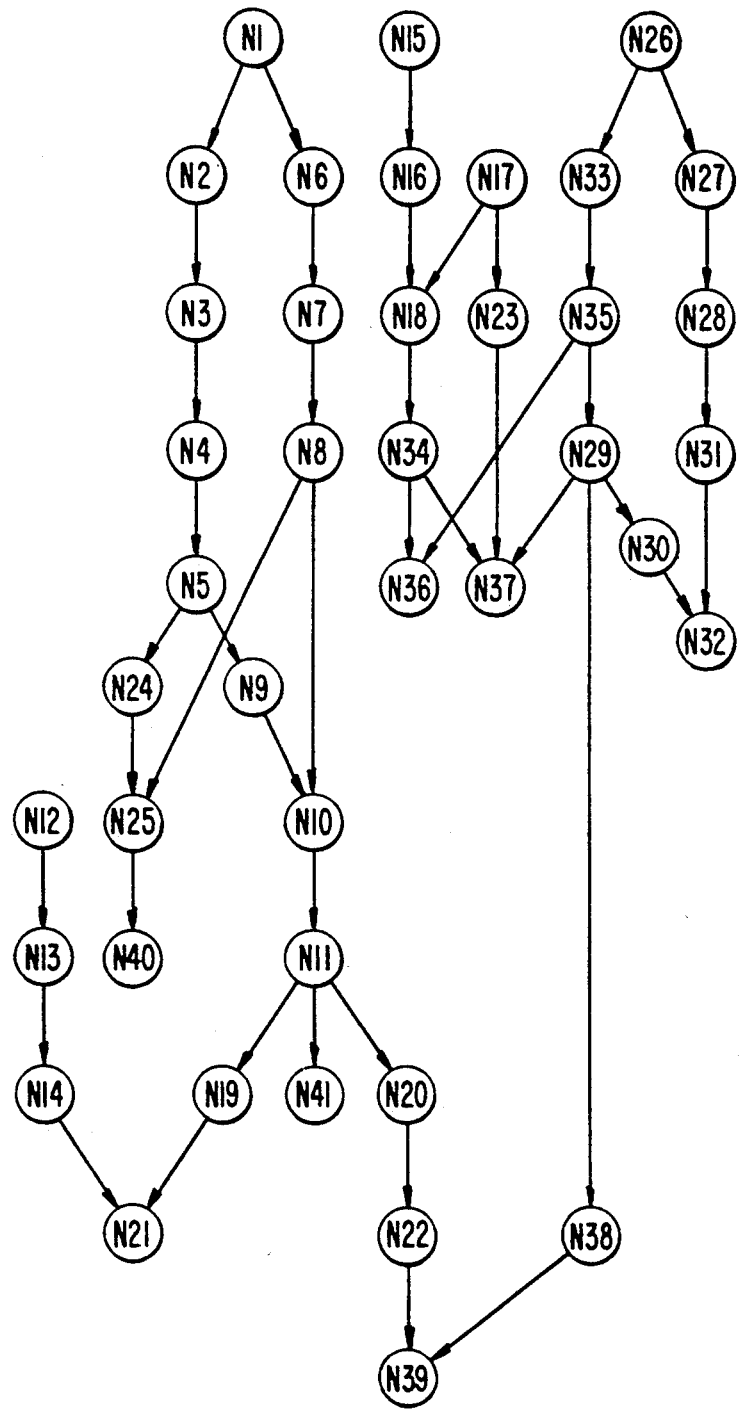
FIG. 11 is the directed acyclic graph of the inner loop of a typical program.

FIG. 11 is a directed acyclic graph (DAG) of a typical program. It is of the inner loop of the program "ENTCAF and ENTRE: Evaluation of Normalized Taylor Coefficients of an Analytic Function", CACM 14 (10), October 1971, p.p. 669–675, which DAG is from Thomas L. Rodeheffer, "COMPILING ORDINARY PROGRAMS FOR EXECUTION ON AN ASYNCHRONOUS MULTIPROCESSOR", Ph.D. Dissertation, Carnegie-Mellon University, 1985.

Figure 12:
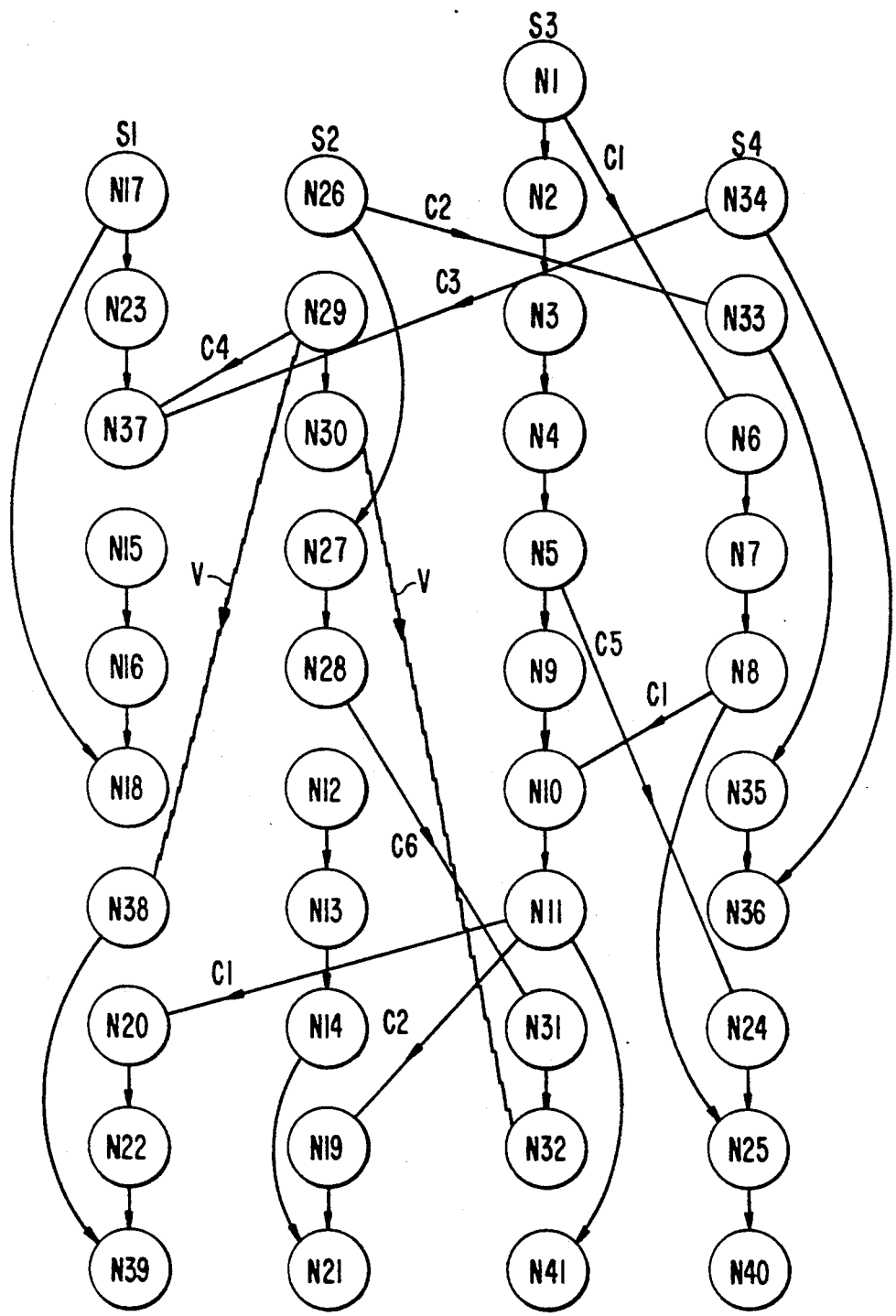
FIG. 12 is the directed acyclic graph of FIG. 11 rearranged into parallel instruction streams.

FIG. 12 shows the rearrangement of the DAG of FIG. 11 into four streams $S_1$–$S_4$ with the nodes ordered in the streams in accordance with the principles of the present invention. It should now be noted that only 11 inter-stream edges are produced, two of which are synchronization redundant. The nine non-synchronization redundant inter-stream edges are enforced by only 6 register channels $C_1$–$C_6$ in view of two re-uses of $C_1$ and 1 re-use of $C_2$.

In general, for an unknown program, the minimum number of register channels necessary to assure synchronization is at least the number sufficient for different values to be written by each processor, each for reading by a different other processor. This is given by the relationship:

$$N_c \geq p(p-1)$$

where:
$N_c$ = number of channels
p = number of processors.

This minimum number may not be sufficient to assure that no processor will block to writing because a channel has not yet been read. The maximum number of channels necessary to assure synchronization is a function of the particular program and has the following upper bound:

$$N_c \leq N_b(p-1)/2$$

where: $N_b$ is the number of nodes in the program basic block.

The results of application of the principles of the invention to test programs suggest that $p(p-1)$ register channels are sufficient for synchronization of typical programs.

The present invention has been described in specific detail but it should be appreciated that numerous modifications, additions and omissions in such details are possible within the intended spirit and scope of the invention. For example, for the purposes of scheduling into streams, each node need not be assigned an incremental height of one but instead might have an incremental height proportional to the expected length of time its operation would take. Thus, each node would have a height equal to its incremental height plus the height of its tallest child.

What is claimed is:

1. A compiling method for scheduling data-dependent operations, describable as a directed acyclic graph of nodes, representing operations, and edges, representing data dependencies, into a plurality of parallel instruction streams for execution by a plurality of respective digital processors and for scheduling synchronizing data transfers on a plurality of inter-processor data transfer means, each being usable for transfer of synchronizing data from one to another of said processors, said method comprising:

scheduling all nodes of said graph into said plurality of streams with each edge of said graph being describable as either an intra-stream edge directed between nodes scheduled in the same stream or an inter-stream edge directed between nodes scheduled in different streams, said nodes being scheduled in a manner that the intra-stream edges are directed in the same direction;

identifying synchronization redundant edges among said inter-stream edges; and scheduling inter-stream edges which are not synchronization redundant as synchronizing data transfers on said inter-processor data transfer means.

2. The method of claim 1 wherein said scheduling all nodes is performed in a manner for substantially minimizing the number of inter-stream edges.

3. The method of claim 1 wherein said scheduling all nodes is determined generally inversely from the order in which the operations represented by said nodes are to be performed by said processors and comprises:

identifying, among unscheduled nodes of said graph, a plurality of nodes having the greatest height; and scheduling nodes from said plurality of nodes of greatest height into different streams, while substantially minimizing the number of resulting inter-stream edges directed to scheduled nodes.

4. The method of claim 3 wherein said scheduling all nodes further comprises:

identifying, for a plurality of said scheduled nodes from said plurality of nodes of greatest height, any sub-graphs rooted at said scheduled nodes; and scheduling, if possible, an equal number of nodes of the respective identified sub-graphs into the same respective streams as the scheduled nodes of greatest height rooting said respective sub-graphs, said scheduling of nodes of the respective identified sub-graphs being determined in order of descending node height from said scheduled nodes rooting said respective identified sub-graphs.

5. The method of claim 4 further comprising repeating said identifying among unscheduled nodes of said graph, a plurality of nodes having the greatest height after said scheduling, if possible, an equal number of nodes of the respective identified sub-graphs.

6. The method of claim 1 wherein said scheduling inter-stream edges which are not synchronization redundant comprises:

identifying among said inter-stream edges which are not synchronization redundant, edges representing data dependencies which must be resolved in a definite order as candidates for scheduling by re-use of the same inter-processor data transfer means.

7. The method of claim 6 wherein said identifying among said inter-stream edges which are not synchronization redundant, edges as candidates for scheduling by re-use of the same inter-processor data transfer means, is such that re-use will not cause implicit synchronizations due to the possibility of blocking to writing on said data transfer means.

8. The method of claim 6 further comprising:

identifying implicit synchronizations due to the possibility of blocking to reading on re-used inter-processor data transfer means; and identifying further inter-stream edges that would be rendered synchronization redundant by said implicit synchronizations.

9. A compiling method for scheduling data-dependent operations, describable as a directed acyclic graph of nodes, representing operations, and edges, representing data dependencies, into a plurality of parallel instruction streams for execution by a plurality of respective digital processors comprising:

scheduling all nodes of said graph into said plurality of streams with each edge of said graph being describable as either an intra-stream edge directed between nodes in the same stream or an inter-stream edge directed between nodes in different streams, said nodes being scheduled in a manner such that the intra-stream edges are directed in the same direction; and wherein said scheduling all nodes is performed in a manner for minimizing the number of inter-stream edges.

10. The method of claim 9 wherein said scheduling all nodes is determined generally inversely from the order in which the operations represented by said nodes are to be performed by said processors and comprises:

identifying, among unscheduled nodes of said graph, a plurality of nodes having the greatest height in said graph; and scheduling nodes from said plurality of nodes of greatest height into different streams while minimizing the number of resulting inter-stream edges directed to scheduled nodes.

11. The method of claim 10 further comprising:

identifying, for a plurality of said nodes scheduled from said plurality of nodes of greatest height, any sub-graphs rooted at each said node; and scheduling, if possible, an equal number of nodes of the respective identified sub-graphs into the same respective streams as the scheduled nodes from said plurality of nodes of greatest height rooting said respective sub-graphs, said scheduling of nodes of the respective identified sub-graphs being determined in order of descending node height from said scheduled nodes rooting said respective identified sub-graphs.

12. The method of claim 11 further comprising repeating said identifying among unscheduled nodes of said graph, a plurality of nodes having the greatest height after said scheduling, if possible, an equal number of nodes of the respective identified sub-graphs.

13. In a multiprocessor having first and second parallel processors for performing sequential operations specified in respective first and second instruction streams having cross-stream data dependencies, a register channel accessible by said processors characterized by a synchronization bit indicating whether said register channel has been written to, and a memory accessible to said processors not having a synchronization bit, the method of passing plural cross-stream dependent data between said processors in a synchronizing fashion comprising:

first writing, by said first processor to said memory, first cross-stream dependent data available to said first processor;

second writing, by said first processor to said register channel, not earlier than said first writing, second cross-stream dependent data available to said first processor;

waiting, if necessary, by said second processor until said synchronization bit indicates that said second writing has occurred;

first reading, by said second processor, the second cross-stream dependent data from said register channel; and second reading, by said second processor, not earlier than said first reading of the first cross-stream dependent data from said memory.

14. In a multiprocessor having first, second and third parallel processors for performing sequential operations specified in respective first, second and third instruction streams having cross-stream data dependencies, first and second register channels accessible by said processors each characterized by a synchronization bit indicating whether said register channel has been written to, and a memory accessible to said processors not having a synchronization bit, the method of passing plural cross-stream dependent data between said processors in synchronizing fashion comprising:

first writing, by said first processor to said memory, first cross-stream dependent data available to said first processor;

second writing by said first processor to said first register channel, not earlier than said first writing, second cross-stream dependent data available to said first processor;

first waiting, if necessary, by said second processor until said synchronization bit of said first register channel indicates that said second writing has occurred;

first reading by said second processor of the second cross-stream dependent data from said first register channel;

third writing, by said second processor to said second register channel, not earlier than said second reading, third cross-stream dependent data available to said second processor;

second waiting, if necessary, by said third processor until said synchronization bit of said second register channel indicates that said third writing has occurred;

second reading, by said third processor, the third cross-stream dependent data from said second register channel; and third reading by said third processor, not earlier than said second reading, the first cross-stream dependent data from said memory.

15. In a multiprocessor having a plurality of parallel processors for performing sequential operations specified respectively in a plurality of instruction streams having cross-stream data dependencies, a plurality of register channels accessible by said processors for synchronizing data passing between said processors, and a memory accessible to said processors for non-synchronizing data passing between said processors, the method for passing plural cross-stream dependent data between processors in a synchronized fashion comprising:

first writing, by one of said processors to said memory means, first cross-stream dependent data available to said first processor;

last reading said first cross-stream dependent data from said memory means by another of said processors; and enforcing other cross-stream data dependencies by a sequence of one or more writing-reading pairs associated respectively with one or more register channels, said sequence beginning with a second writing to a register channel, not earlier than said first writing, and ending with a next-to-last reading, from the same or different register channel not later than said last reading.

* * * * *